(12) United States Patent
Lin et al.

(10) Patent No.: US 6,971,296 B2
(45) Date of Patent: Dec. 6, 2005

(54) VENETIAN BLIND CUTTING MACHINE

(75) Inventors: Jung-Kuei Lin, Hsinchu (TW);
Kuei-Lu Liu, Hsinchu (TW)

(73) Assignees: Industrial Technology Research Institute, Hsinchu Hsien (TW); Nien Made Enterprise Co., Ltd, Taichung (TW)

( * ) Notice: Subject to any disclaimer, the term of this patent is extended or adjusted under 35 U.S.C. 154(b) by 289 days.

(21) Appl. No.: 10/331,554

(22) Filed: Dec. 31, 2002

(65) Prior Publication Data

US 2004/0065180 A1    Apr. 8, 2004

(30) Foreign Application Priority Data

Oct. 2, 2002  (TW) ............................... 91215607 U

(51) Int. Cl.⁷ ............................................. B23D 23/00
(52) U.S. Cl. ............................. 83/404; 83/412; 83/454; 83/569
(58) Field of Search .......................... 83/198, 196, 454, 83/569, 549, 404, 404.1, 405, 412

(56) References Cited

U.S. PATENT DOCUMENTS

| | | | | |
|---|---|---|---|---|
| 5,072,494 A | * | 12/1991 | Graves et al. ............... | 29/24.5 |
| 5,456,149 A | * | 10/1995 | Elsenheimer et al. ......... | 83/564 |
| 5,799,557 A | * | 9/1998 | Wang ......................... | 83/639.5 |
| 5,927,172 A | * | 7/1999 | Wang .......................... | 83/454 |
| 6,003,218 A | * | 12/1999 | Schumann et al. .......... | 29/24.5 |
| 6,079,306 A | * | 6/2000 | Liu ............................ | 83/454 |
| 6,412,381 B1 | * | 7/2002 | Wang et al. .................. | 83/454 |
| 6,427,571 B1 | * | 8/2002 | Hsu ............................ | 83/454 |
| 2003/0015074 A1 | * | 1/2003 | Roberts et al. ................ | 83/13 |
| 2003/0066403 A1 | * | 4/2003 | Lin et al. ...................... | 83/412 |
| 2003/0140756 A1 | * | 7/2003 | Lin et al. ...................... | 83/454 |

* cited by examiner

*Primary Examiner*—Charles Goodman
(74) *Attorney, Agent, or Firm*—Bacon & Thomas PLLC

(57) ABSTRACT

A Venetian blind cutting machine is constructed to include a machine base, two blind locating modules mounted on the machine base at different elevations, each of which having a set of through holes for supporting component parts of a Venetian blind to be cut, a blind carriage adapted to carry the Venetian blind to be cut, a carriage for moving the blind carriage to the elevation of one of the blind locating modules for enabling the Venetian blind to be cut to be put in the selected blind locating module for cut, a cutter provided at the other side of the blind locating modules, and a cutter drive adapted to move the cutter across the imaginary axis passing through each of the through holes of the blind locating modules to cut the component parts of the loaded Venetian blind and then to return the cutter after cutting.

9 Claims, 7 Drawing Sheets

VENETIAN BLIND CUTTING MACHINE

BACKGROUND OF THE INVENTION

1. Field of the Invention

The present invention relates to a Venetian blind cutting machine adapted to cut the headrail, bottom rail, and slats of a Venetian blind to the desired length and, more particularly, to such a Venetian blind cutting machine, which has means to lift/lower the Venetian blind to be cut automatically to the desired elevational cutting position.

2. Description of the Related Art

A variety of Venetian blind cutting machines have been disclosed and have appeared on the market. Similar designs are seen in U.S. Pat. Nos. 5,799,557; 5,927,172; 6,089,302. These Venetian blind cutting machines commonly comprise a blind locating assembly having through holes for supporting the headrail, bottom rail, and slats of a Venetian blind to be cut, a cutter, and an air cylinder or reversible motor adapted to drive the cutter to cut the parts of the Venetian blind to the desired length. These Venetian blind cutting machines are commonly used in blind sale centers and operated by a salesman to cut the Venetian blind to the length requested by the consumer buying the Venetian blind. Because the blind locating assembly of a Venetian blind cutting machine fits one particular model of Venetian blinds only. When cutting a different model of Venetian blind, a different blind locating assembly shall be used. It is complicated to change the blind locating assembly of a Venetian blind.

In order to eliminate the aforesaid problem, Venetian blind cutting machines having two blind locating assemblies are developed. A Venetian blind cutting machine having two blind locating assemblies is suitable for cutting two different types of Venetian blinds.

Further, a Venetian blind cutting machine has a carriage adapted to carry a Venetian blind to be cut. When a Venetian blind placed on the carriage, it is then pushed into the blind locating assembly for cutting. When a Venetian blind cutting machine having two blind locating assemblies is used, the user may have to adjust the elevation of the blind carriage to the selected blind locating assembly. Because the elevation adjustment structure of the blind carriage is adjusted manually, the adjustment of the blind carriage takes much time and labor.

SUMMARY OF THE INVENTION

The present invention has been accomplished under the circumstances in view. It is therefore one object of the present invention to provide a Venetian blind cutting machine, which has means to automatically move the Venetian blind to the desired elevation for setting into the selected cutting position.

It is another object of the present invention to provide a Venetian blind cutting machine, which saves much vertical installation space.

To achieve these objects of the present invention, the Venetian blind cutting machine comprises a machine base, two blind locating modules mounted on the machine base at different elevations, the blind locating modules each having a set of through holes for supporting component parts of a Venetian blind to be cut, a blind carriage adapted to carry the Venetian blind to be cut, a carriage driving mechanism mounted on the machine base at one side of the blind locating modules for moving the blind carriage to the elevation of one of the blind locating modules for enabling the Venetian blind to be cut to be put in the selected blind locating module for cut, a cutter provided at the other side of the blind locating modules, and a cutter drive adapted to move the cutter across the imaginary axis passing through each of the through holes of the blind locating modules to cut the component parts of the loaded Venetian blind to the desired length and then to return the cutter after cutting.

According to a first embodiment of the present invention, the carriage driving mechanism uses a reversible motor to rotate a double-thread screw rod, causing two movable screw nuts to move two pair of links and to further lift/lower the blind carriage.

According to a second embodiment of the present invention, air cylinders are used to reciprocate two slides on two parallel sliding rails, causing the slides to move two pairs of links and to further lift/lower the blind carriage.

DETAILED DESCRIPTION OF THE INVENTION

Figure 1:
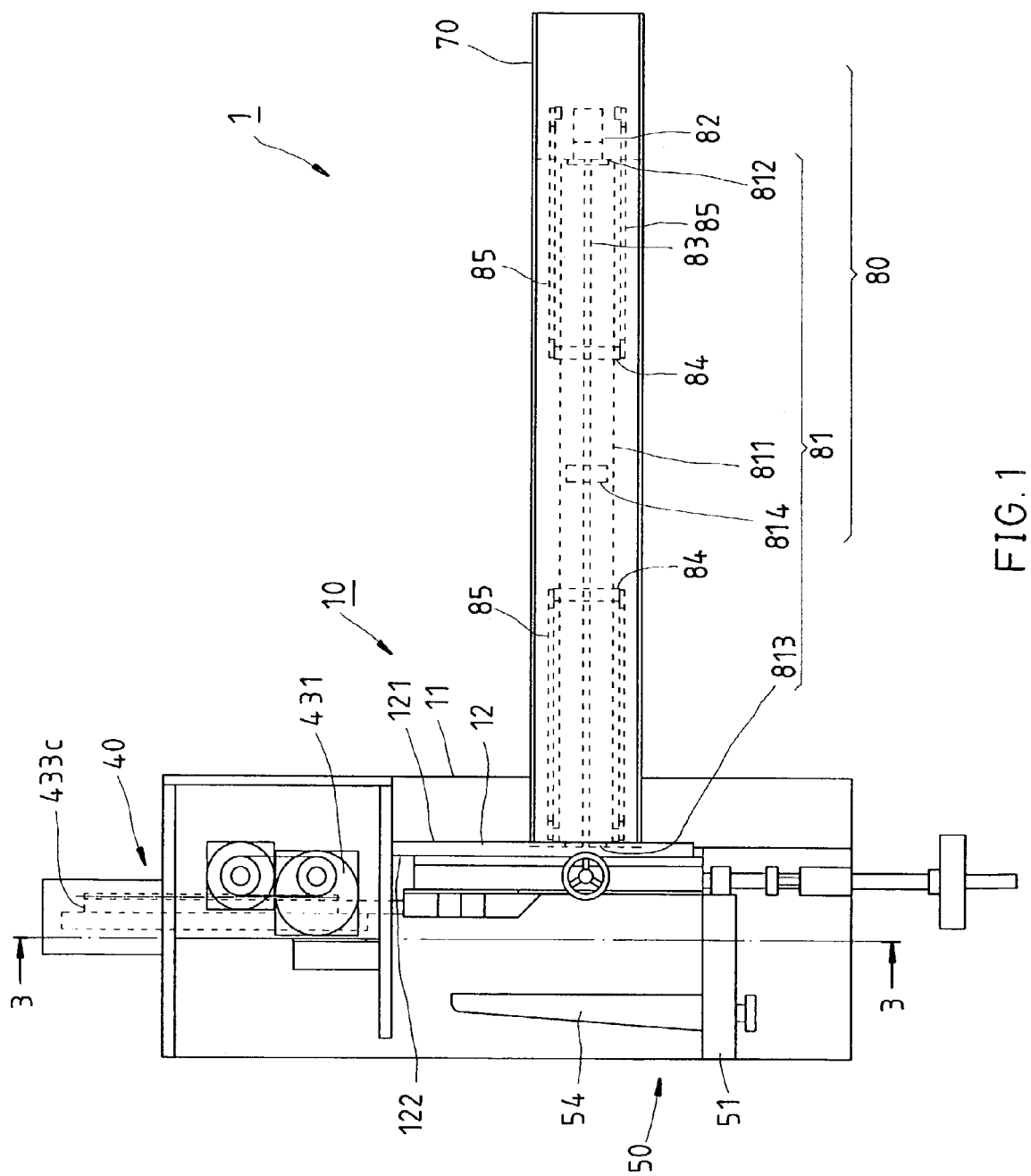
FIG. 1 is a top view of a Venetian blind cutting machine constructed according to a first preferred embodiment of the present invention.
Figure 2:
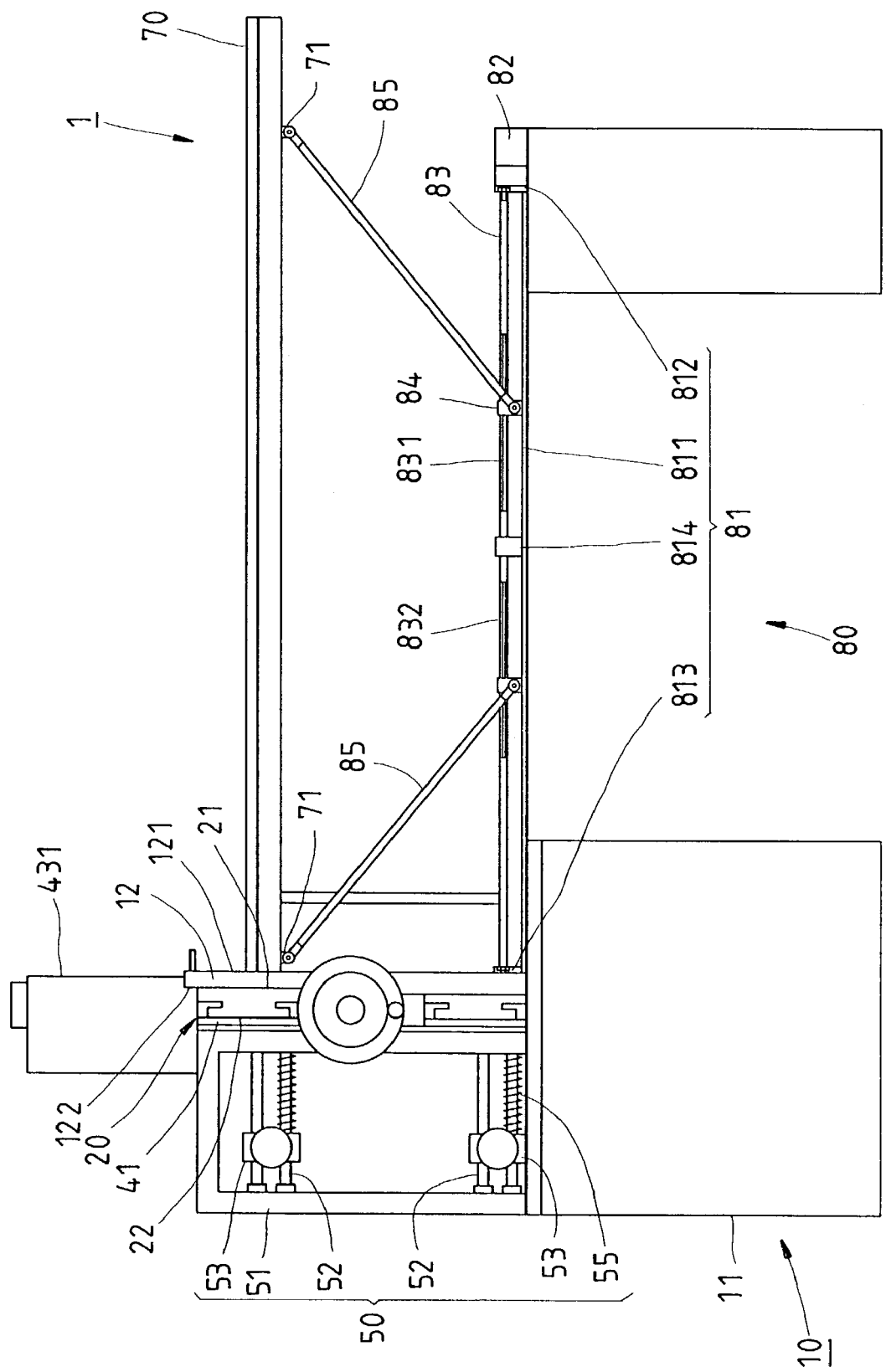
FIG. 2 is a side view of the Venetian blind cutting machine according to the first embodiment of the present invention.
Figure 3:
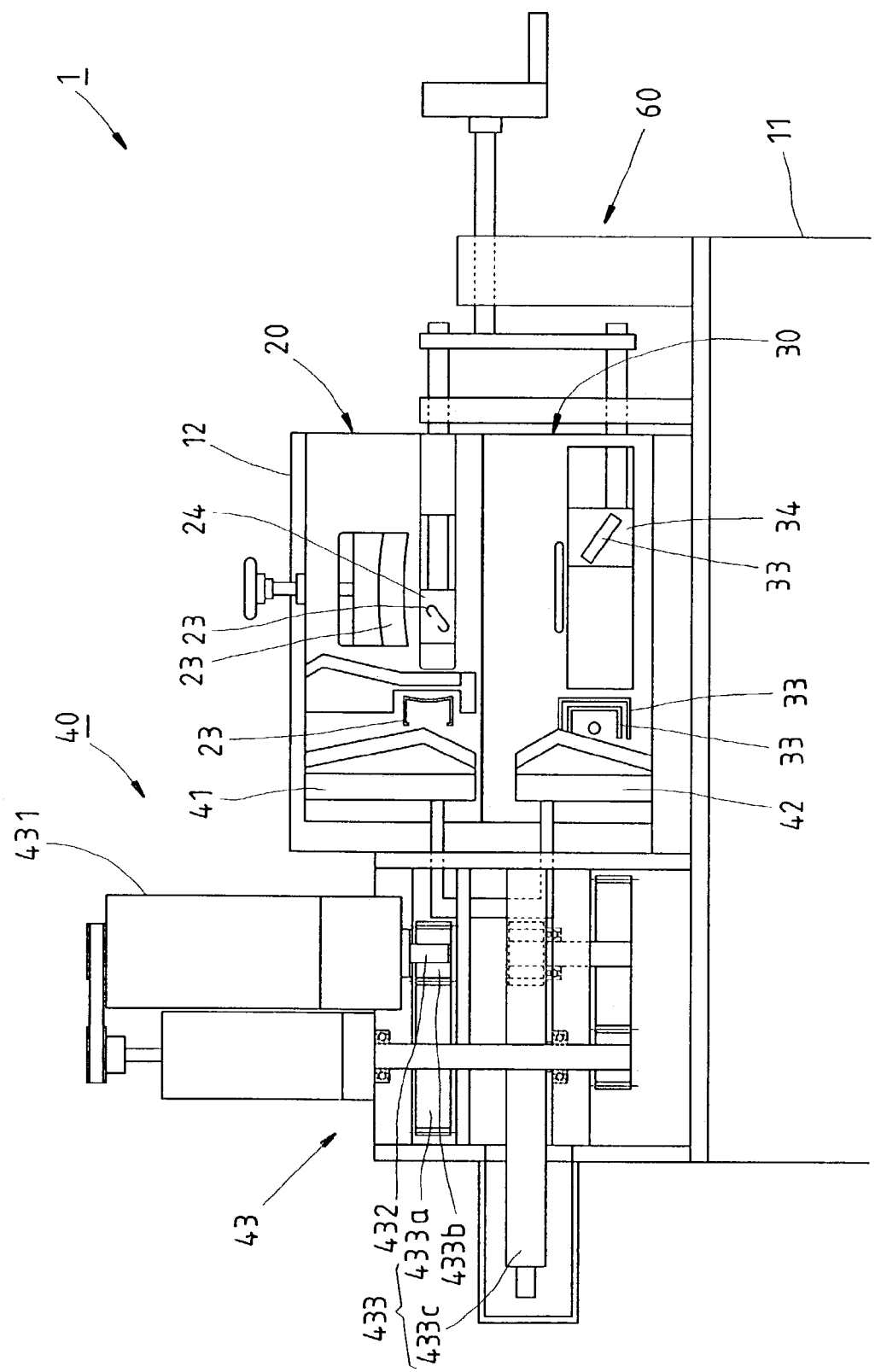
FIG. 3 is a sectional view in an enlarged scale taken along line 3—3 of FIG. 1.

Referring to FIGS. 1~3, a Venetian blind cutting machine 1 in accordance with the first preferred embodiment of the present invention is shown comprised of a machine base 10, two blind locating modules, namely, the first blind locating module 20 and the second blind locating module 30, a cutter unit 40, a limiter 50, and a die block adjustment mechanism 60.

The machine base 10 comprises a base support frame 11, and a vertical mount 12 located on the top side of the base support frame 11. The vertical mount 12 has a first side 121, a second side 122 opposite to the first side 121, and two openings (not shown) cut through the first side 121 and the second side 122 at different elevations.

The blind locating modules 20 and 30 each have a first side 21 or 31, a second side 22 or 32 opposite to the first side 21 or 31, through holes 23 or 33, and die blocks 24 or 34. The through holes 23 and 33 of the blind locating modules 20 and 30 are made subject to the cross-sections of the component parts of two different types of Venetian blinds, so that the component parts of two different types of Venetian blinds can be respectively positioned in the through holes 23 and 33 of the blind locating modules 20 and 30. The blind locating modules 20 and 30 are respectively mounted on the vertical mount 12 of the machine base 10 at different elevations, keeping the first sides 21 and 31 of the blind locating modules 20 and 30 respectively attached to the second side 122 of the vertical mount 12 and the through holes 23 and 33 of the blind locating modules 20 and 30 respectively aimed at the openings of the vertical mount 12. The two opposite sides corresponding to the first sides 21 and 31 and second sides 22 and 32 of the blind locating modules 20 and 30 are defined hereinafter as the first lateral side and the second lateral side respectively.

The cutter unit 40 comprises two cutters 41 and 42, and a cutter drive 43. The cutters 41 and 42 are respectively coupled to a respective transverse sliding track at the second sides 22 and 32 of the blind locating modules 20 and 30 for a reciprocating motion on the respective transverse sliding track. The reciprocating paths provided by the transverse sliding tracks at the second sides 22 and 32 of the blind locating modules 20 and 30 pass across the imaginary axes passing through the through holes 23 and 33 of the blind locating modules 20 and 30 respectively, so that the cutters 41 and 42 can be moved across the imaginary axes passing through the through holes 23 and 33. The cutter drive 43 comprises a reversible motor 431 mounted on the machine base 10, and a transmission gear set 433 formed of transmission gears 433*a* and 433*b* and a rack 433*c* and coupled between the output shaft 432 of the reversible motor 431 and the cutters 41 and 42 for reciprocating the cutters 41 and 42 along the transverse sliding tracks at the second sides 22 and 32 of the blind locating modules 20 and 30. During each reciprocating cycle, the cutters 41 and 42 are moved across the imaginary axes passing through the through holes 23 and 33 and then returned to their former positions.

The limiter 50 comprises a rack 51 mounted on the machine base 10, two pairs of sliding rails 52 respectively made of round rods and mounted in the rack 51 at different elevations corresponding to the through holes 23 and 33 of the blind locating modules 20 and 30, two slides 53 respectively and slidably coupled to the pairs of sliding rails 52, two stop plates 54 respectively mounted on the slides 53 and extended across the imaginary axes passing through the through holes 23 and 33 and adapted to stop the slats of the Venetian blinds being inserted through the through holes 23 and 33 of the blind locating modules 20 and 30 for cut, and two coil springs 55 respectively mounted on the sliding rails 52 and stopped against the slides 53.

The die block adjustment mechanism 60 is located on the machine base 10, and adapted to adjust the positions of the die blocks 24 and 34 of the blind locating modules 20 and 30 manually.

The structure of the aforesaid Venetian blind cutting machine is similar to the conventional designs. The operation of the Venetian blind cutting machine is outlined hereinafter. At first, the operator insert the component parts of one of the two different Venetian blinds from the first lateral side through the through holes 23 or 33 of the blind locating modules 20 and 30 to the second lateral side, enabling the corresponding ends of the component parts of the inserted Venetian blinds to be respective topped at the stop plates 54. Thereafter, the operator starts the cutter drive 43 of the cutter unit 40 to feed the cutters 41 and 42, causing the cutters 41 and 42 to cut the component parts of the inserted Venetian blinds to the desired length.

The Venetian blind cutting machine further comprises a blind carriage 70, and a carriage driving mechanism 80. The carriage driving mechanism 80 comprises a base framework 81 located on the machine base 10, a reversible motor 82, a double-thread screw rod 83, two transmission devices 84, and four links 85. The base framework 81 comprises a platform 811, and two side plates, namely, the first side plate 812 and the second side plates 813 vertically disposed at two lateral sides of the platform 811. The reversible motor 82 is located on the first side plate 812, keeping the output shaft (not shown) thereof suspended above the platform 811. The double-thread screw rod 83 has one end coupled to the output shaft of the reversible motor 82, a middle part supported in an axle bearing in an upright axle holder 814 at the platform 811, and the other end supported in an axle bearing in the second side plate 813. The two threads 831 and 832 of the double-thread screw rod 83 extend in reversed directions. The transmission devices 84 are screw nuts respectively threaded onto the threads 831 and 832 of the double-thread screw rod 83. The links 85 are respectively and bilaterally pivoted with one end thereof to the transmission devices 84. The blind carriage 70 has four pivot holders 71 fixedly provided at the bottom sidewall thereof in four corners, and respectively pivoted to the other end of each of the links 85. The blind carriage 70 is maintained in horizontal in the first lateral side relative to the blind locating modules 20 and 30.

When started the reversible motor 82 to rotate the double-thread screw rod 83, the screw nuts 84 are moved relative to each other along the double-thread screw rod 83, thereby causing the links 85 are moved to lift or lower the blind carriage 70 between the elevation of the first blind locating module 20 and the elevation of the second blind locating module 30.

Further, sensors, for example, limit switches (not shown) are provided at locations within the path of the screw nuts 84 to control the upper and lower limit positions of the blind carriage 70, enabling the blind carriage 70 to be stopped at the elevation of first blind locating module 20 or the elevation of the second blind locating module 30.

Figure 4:
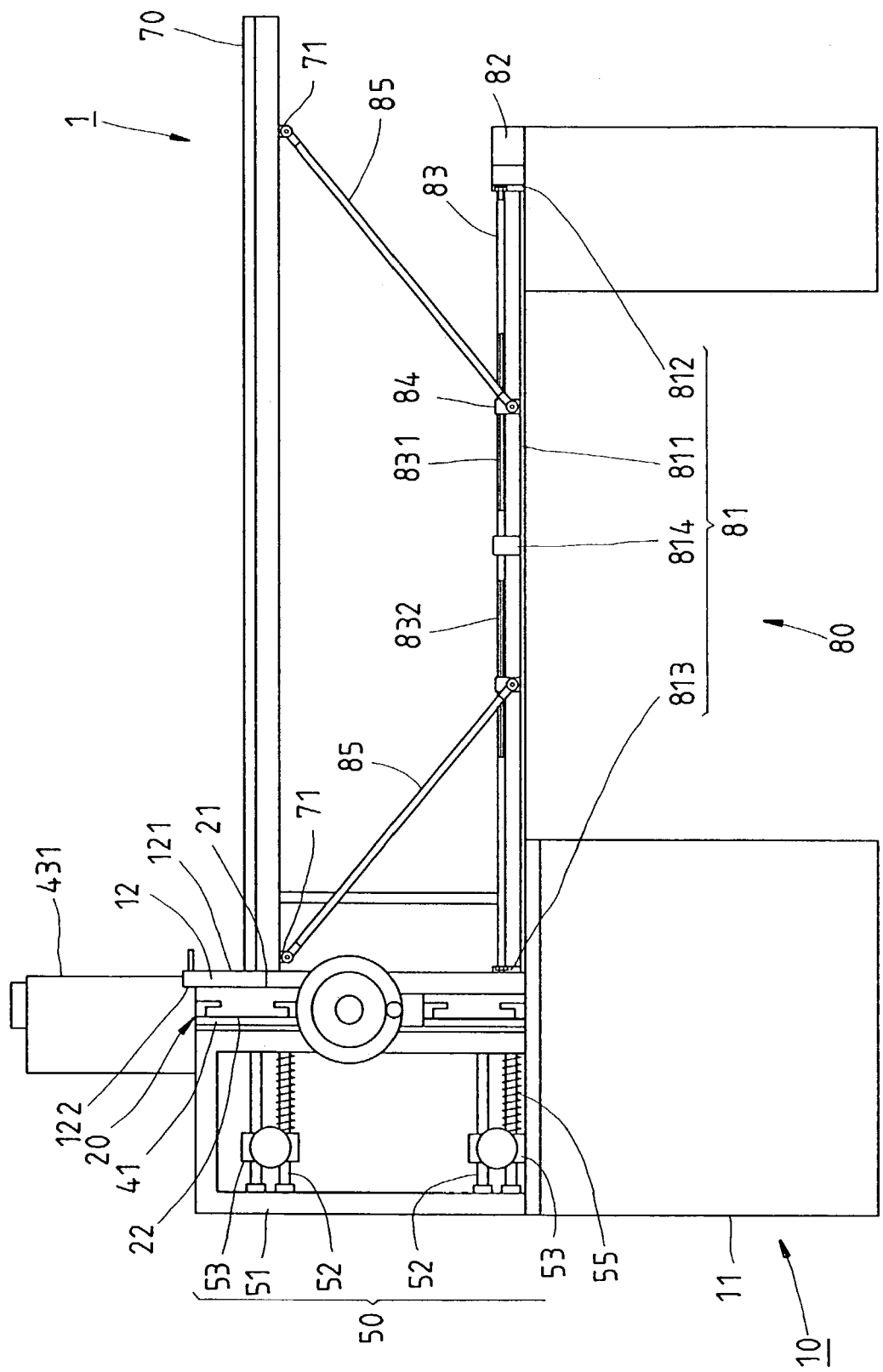
FIG. 4 is an operational view of the present invention showing the blind carriage lifted to the elevation of the first blind locating module.
Figure 5:
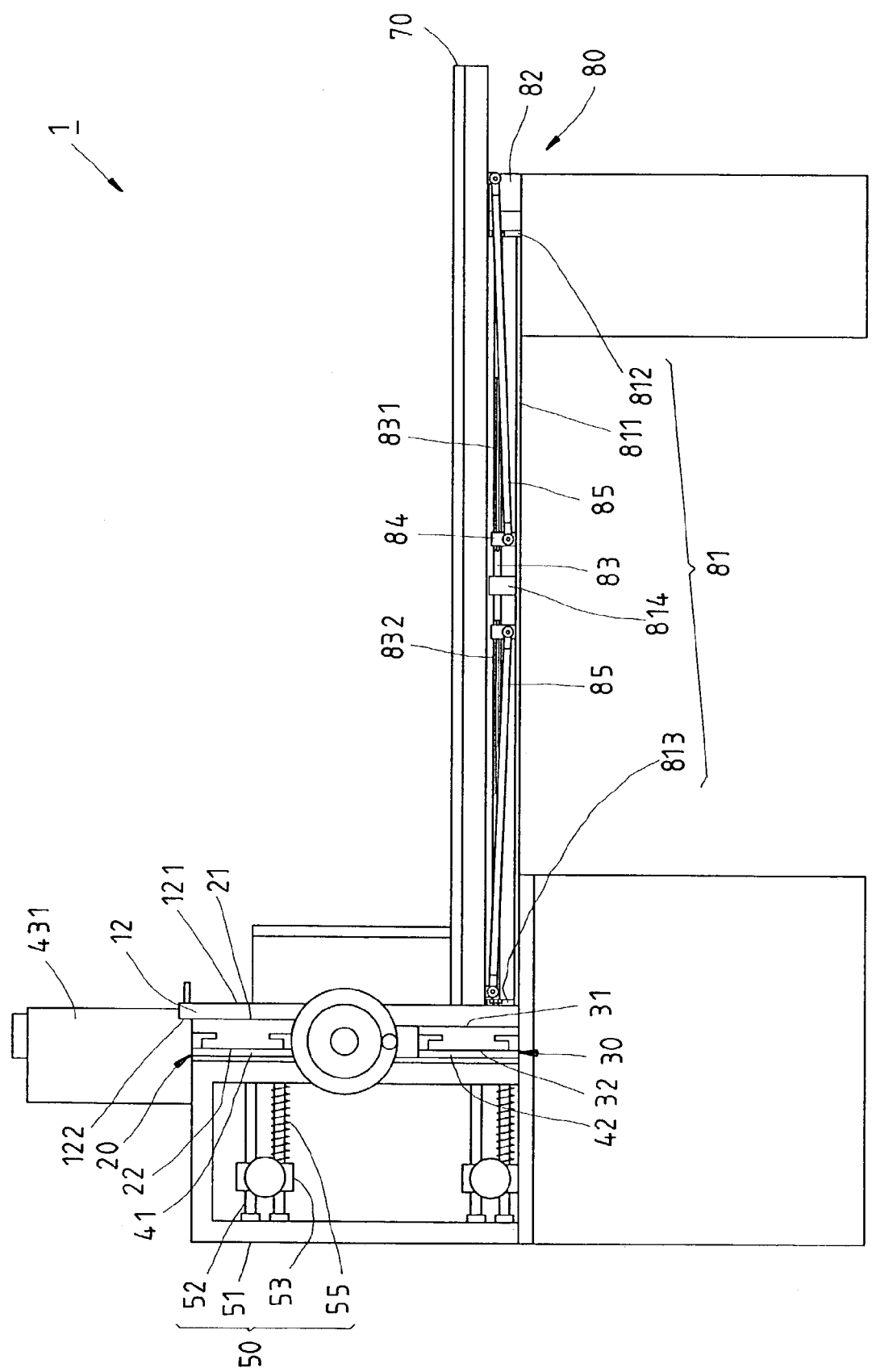
FIG. 5 is similar to FIG. 4 but showing the blind carriage lowered to the elevation of the second blind locating module.

Referring to FIGS. 4 and 5, by means of the blind carriage 70 and the carriage driving mechanism 80, the operator can carry a Venetian blind to be cut on the blind carriage 70 to the elevation of the first blind locating module 20 as shown in FIG. 4, or the elevation of the second blind locating module 30 as shown in FIG. 5 subject to the type of the Venetian blind carried on the blind carriage 70. If the Venetian blind must be set in the first blind locating module 20 for cutting, the operator can control the carriage driving mechanism 80 to lift the blind carriage 70 to the elevation of the first blind locating module 20 as shown in FIG. 4, and then put the component parts of the Venetian blind on the blind carriage 70, and then push the component parts of the Venetian blind through the through holes 23 of the first blind locating module 20, and then operate the cutter unit 40 to cut the component parts of the Venetian blind to the desired length. If the Venetian blind must be set in the second blind locating module 30 for cutting, the operator can control the carriage driving mechanism 80 to lower the blind carriage 70 to the elevation of the second blind locating module 30 as shown in FIG. 5, and then put the component parts of the Venetian blind on the blind carriage 70, and then push the component parts of the Venetian blind through the through holes 33 of the second blind locating module 30, and then operate the cutter unit 40 to cut the component parts of the Venetian blind to the desired length.

By means of controlling the carriage driving mechanism 80, the blind carriage 70 is automatically adjusted to the desired elevation for enabling the workpiece to be set into position for cutting by the cutter unit 40. Therefore, the blind cutting machine saves much labor and time.

When the carriage 70 lowered to the lower limit position (the elevation of the second blind locating module 30), the links 85 are approximately set in horizontal and received in between the blind carriage 70 and the platform 811 of the base framework 81 of the carriage driving mechanism 80. At this time, the height between the base framework 81 and the blind carriage 70 is minimized, i.e., the installation of the carriage driving mechanism 80 does not occupy much vertical installation space.

Figure 6:
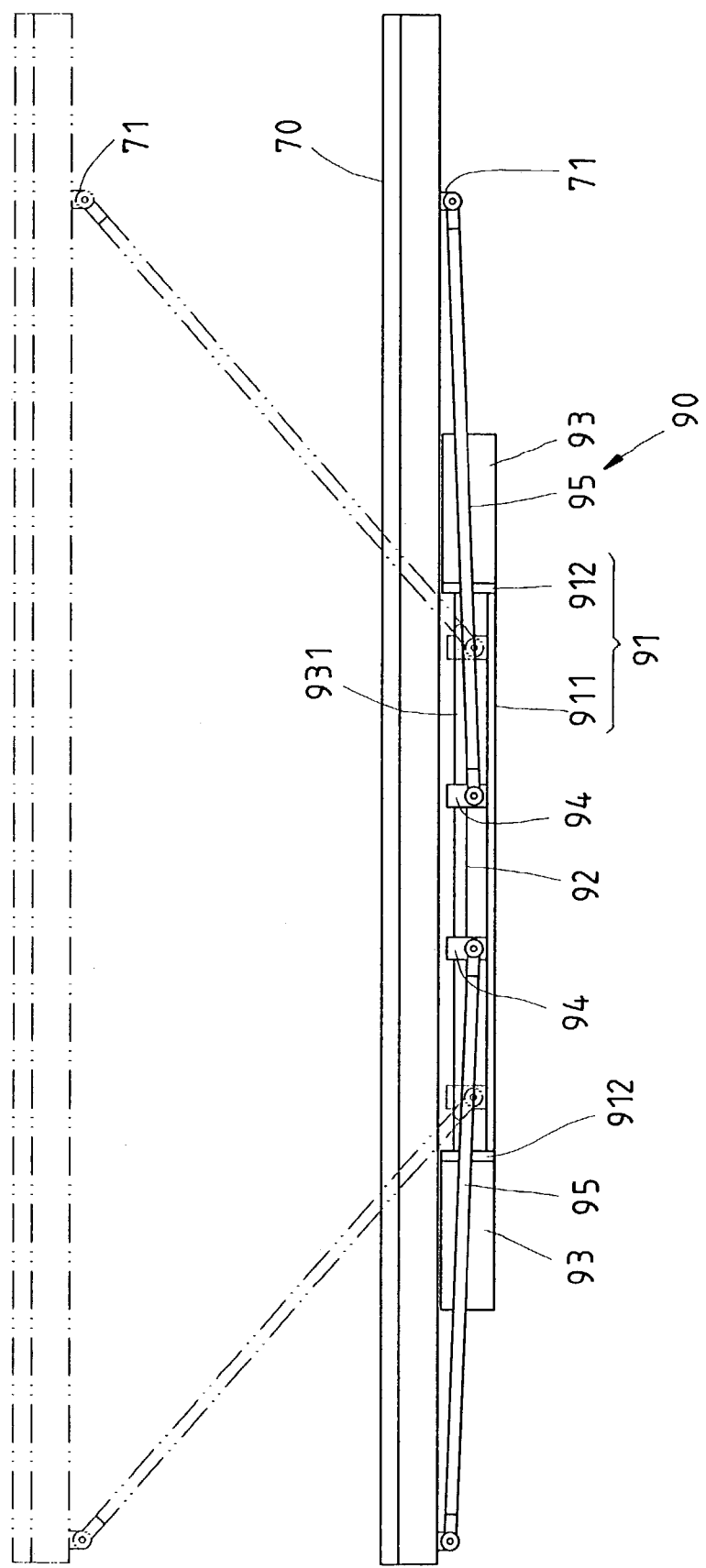
FIG. 6 is a schematic drawing of a part of the Venetian blind cutting machine according to the second preferred embodiment of the present invention, showing the blind carriage moved between the upper limit position and the lower limit position.
Figure 7:
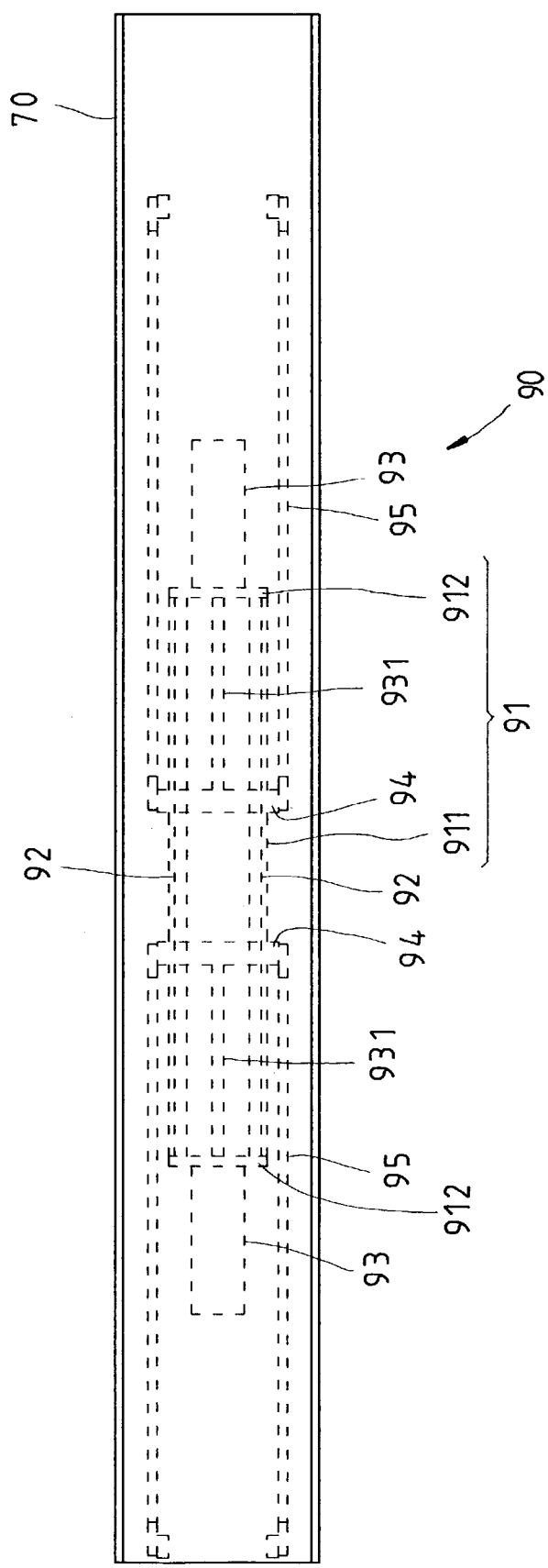
FIG. 7 is a top plain view of FIG. 6.

FIGS. 6 and 7 show the second preferred embodiment of the present invention. Similar to the aforesaid first embodiment of the present invention, the blind cutting machine according to the second embodiment of the present invention is comprised of a machine base, two blind locating modules, a cutter unit, a limiter, and a die block adjustment mechanism. This embodiment further comprises a blind carriage 70 and a carriage driving mechanism 90.

The carriage driving mechanism 90 comprises a base framework 91 located on the machine base, two sliding rails 92, two air cylinders 93, two slides 94, and four links 95. The base framework 91 comprises a platform 911, and two side plates 912 vertically disposed at two lateral sides of the platform 911. The sliding rails 92 are connected between the side plates 912 and arranged in parallel. The air cylinders 93 are respectively mounted in the side plates 912, each having a piston rod 931 suspended above the platform 911 between the sliding rails 92. The slides 94 are slidably mounted on the sliding rails 92 and coupled to the piston rods 931 of the air cylinders 93. The links 95 are respectively and bilaterally pivoted with one end thereof to the slides 94. The blind carriage 70 has four pivot holders 71 fixedly provided at the bottom sidewall thereof in four corners and respectively pivoted to the other end of each of the links 95. The blind carriage 70 is maintained in horizontal in the first lateral side relative to the blind locating modules.

When compressed air provided to the air cylinders 93 to extend out the piston rods 931, the slides 94 are moved along the sliding rails 92 toward each other to lower the blind carriage 70 to the lower limit position. On the contrary, when compressed air provided to the air cylinders 93 to pull back the piston rods 931, the slides 94 are moved along the sliding rails 92 apart from each other to lift the blind carriage 70 to the upper limit position.

What is claimed is:

1. A Venetian blind cutting machine comprising:
   a machine base;
   at least first and second blind locating modules provided in said machine base at a first and a second elevation, respectively, the blind locating modules defining a first lateral side and a second lateral side opposite the first lateral side, said blind locating modules each having a set of through holes dimensioned and configured for through-passage of component parts of a Venetian blind to be cut;
   a carriage driving mechanism mounted on said machine base;
   a blind carriage coupled to said driving mechanism, the blind carriage having a flat top surface adapted to carry the Venetian blind to be cut, the blind carriage being movable between at least a first position wherein the Venetian blind is positioned at said first elevation and a second position wherein the Venetian blind is positioned at said second elevation; and
   a cutter unit mounted on said machine base, said cutter unit comprising at least one cutter disposed in said second lateral side, and a cutter drive adapted to move said cutter across the imaginary axis passing through each of the through holes of said blind locating modules and then to return said cutter.

2. The Venetian blind cutting machine as claimed in claim 1 wherein said carriage driving mechanism comprises:
   a base framework located on said machine base;
   a double-thread screw rod having two reversed threads;
   a reversible motor located on said base framework and adapted to rotate said double-thread screw rod;
   two transmission devices respectively threaded onto the threads of said double-threaded screw rods; and
   two pairs of links bilaterally coupled between said transmission devices and a bottom sidewall of said blind carriage.

3. The Venetian blind cutting machine as claimed in claim 2, wherein said base framework comprises a platform, a first side plate vertically provided at one lateral side of said platform and holding said reversible motor of said carriage driving mechanism in place, and a second side plate vertically provided at an opposite lateral side of said platform; said double-thread screw rod has one end supported in an axle bearing in said second side plate, a middle part supported in an axle holder at said platform, and a second end coupled to an output shaft of said reversible motor of said carriage driving mechanism.

4. The Venetian blind cutting machine as claimed in claim 2 wherein said blind carriage has four pivot holders locating on the bottom sidewall thereof in four corners and respectively pivoted to said links.

5. The Venetian blind cutting machine as claimed in claim 2 wherein said carriage driving mechanism further comprises a plurality of sensors disposed in the path in which said transmission devices to be moved, and adapted to control movement of said blind carriage to the elevation of one of said blind locating modules.

6. The Venetian blind cutting machine as claimed in claim 1 wherein said carriage driving mechanism comprises:
   a base framework located on said machine base;
   two sliding rails arranged in parallel on said base framework;
   two air cylinders symmetrically located on said base framework, said air cylinders each having a piston rod aimed at each other;
   two slides mounted on said sliding rails and respectively coupled to the piston rods of said air cylinders for reciprocating motion along said sliding rails; and
   two pairs of links respectively and bilaterally coupled between said slides and a bottom sidewall of said blind carriage.

7. The Venetian blind cutting machine as claimed in claim 6, wherein said base framework comprises a platform, and two side plates vertically disposed at two lateral sides of said platform; said sliding rails are connected between said side plates and arranged in parallel above said platform; said air cylinders are respectively mounted in said side plates, keeping the piston rods suspended above said platform between said sliding rails.

8. The Venetian blind cutting machine as claimed in claim 6, wherein said blind carriage has four pivot holders locating on the bottom sidewall thereof in four corners and respectively pivoted to said links.

9. The Venetian blind cutting machine as claimed in claim 6, wherein said carriage driving mechanism further comprises a plurality of sensors disposed in the path in which said slides to be moved, and adapted to control movement of said blind carriage to the elevation of one of said at least two blind locating modules.

* * * * *